United States Patent
Baudry et al.

(10) Patent No.: US 6,904,803 B2
(45) Date of Patent: Jun. 14, 2005

(54) COMPACT INERTIAL SENSOR

(75) Inventors: Hervé Baudry, L'Isle Adam (FR); Paul Featonby, Orsay (FR); Jean-Claude Le Roy, Cergy (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 10/626,540

(22) Filed: Jul. 25, 2003

(65) Prior Publication Data
US 2004/0226371 A1 Nov. 18, 2004

(30) Foreign Application Priority Data
Jul. 26, 2002 (FR) .............................. 02 09496

(51) Int. Cl.⁷ .............................................. G01P 15/10
(52) U.S. Cl. .................................. 73/514.29; 73/514.38
(58) Field of Search ........................ 73/514.29, 514.36, 73/514.37, 514.38, 514.16

(56) References Cited

U.S. PATENT DOCUMENTS 4,939,935 A * 7/1990 Amand .................... 73/514.29
5,165,279 A * 11/1992 Norling et al. .......... 73/514.37
6,128,957 A * 10/2000 Foote ...................... 73/514.29
6,282,959 B1 * 9/2001 Blake et al. ............. 73/514.29
6,393,913 B1   5/2002 Dyck et al.

FOREIGN PATENT DOCUMENTS

FR       2 813 122       2/2002

* cited by examiner

Primary Examiner—John E. Chapman
(74) Attorney, Agent, or Firm—Young & Thompson

(57) ABSTRACT

The inertial sensor comprises at least one vibrating element having one end connected to a support element and an opposite end connected to a test mass which is hinged to the support element by at least two link elements and which includes a cavity in which the vibrating element and a portion of the support element adjacent to the vibrating element are received. The link elements are housed in the cavity surrounding a portion of the support element to which the link elements are connected.

6 Claims, 1 Drawing Sheet

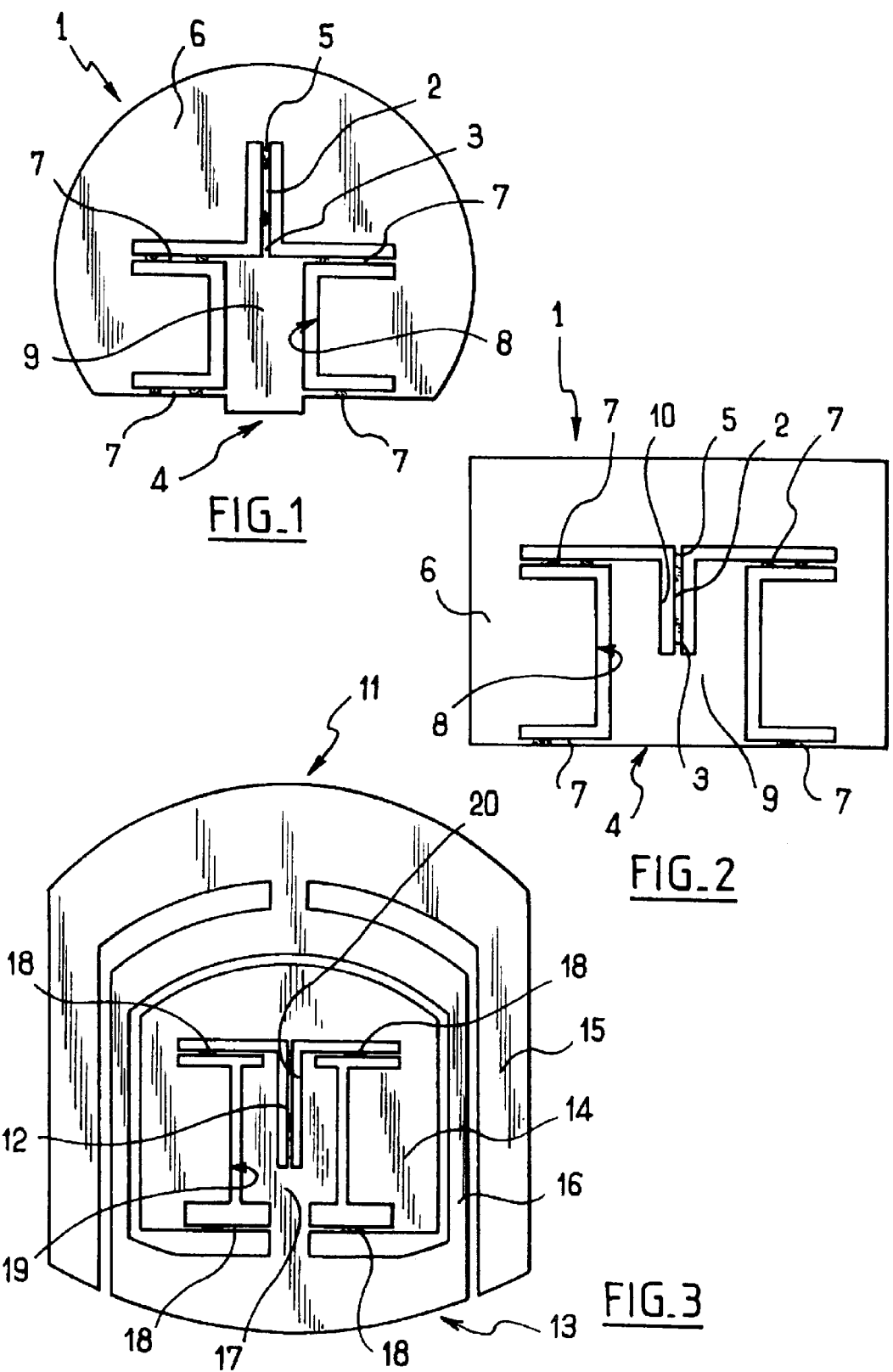

COMPACT INERTIAL SENSOR

The present invention relates to inertial sensors, and in particular to accelerometers.

More particularly, the invention relates to a sensor comprising a sensing cell comprising at least one vibrating element having one end connected to a support element and an opposite end connected to a test mass hinged to the support element via at least two link elements. The vibrating element is associated with excitation means which enable the vibrating element to be set into vibration and which enable the vibration frequency thereof to be detected.

BACKGROUND OF THE INVENTION

When a sensor of this type is subjected to acceleration, the test mass exerts a force on the vibrating element. This force changes the frequency of vibration in such a manner that the variation in the frequency of vibration of the vibrating element makes it possible to determine the acceleration to which the sensor is being subjected.

It is advantageous to have cells of small size. This presents the advantage of making them easier to install in the vehicles they are to equip.

Cells are thus known, in particular from document FR-A-2 739 190, that are made in the form of a plate in which etching is used to define the vibrating element, the support element, the test mass, and the link elements. Particularly compact cells can be obtained in this manner. They also enable a plurality of cells to be integrated in a common substrate, with the cells being made simultaneously so that the cost of manufacture can be relatively low.

Nevertheless, this desire for compactness is constrained by the fact that the dimensioning of the test mass influences the sensitivity of the sensor, the heavier the test mass, the greater the force exerted on the vibrating element.

In order to further reduce the size of cells of the above type while conserving a test mass of sufficient weight, attempts have been made to produce the cell in a thicker plate. Nevertheless that makes the plate more difficult to machine. In such cells, the extra thickness also leads to the sensing axis of the cell being inclined relative to a normal of the plate, thereby complicating installation of the cell in the vehicle that it is to occupy. The position of the sensing axis of the cell also depends on manufacturing variation.

Cells made in the form of a plate are also disclosed in document FR-A-2 813 122.

OBJECTS AND SUMMARY OF THE INVENTION

An object of the invention is to provide a sensor of small size while nevertheless presenting satisfactory sensitivity.

In order to achieve this object, the invention provides an inertial sensor comprising at least one vibrating element having one end connected to a support element and an opposite end connected to a test mass which is hinged to the support element by at least two link elements and which includes a cavity in which the vibrating element and a portion of the support element adjacent to the vibrating element are received. The link elements are housed in the cavity surrounding a portion of the support element to which the link elements are connected.

Thus, it is possible to obtain a structure that is compact, while nevertheless having a test mass that is sufficiently heavy.

Preferably, the support element includes a cavity in which there extends a portion of the vibrating element.

This enables the size of the sensor to be further reduced.

In a particular embodiment, the link elements and the vibrating element are arranged in such a manner that the sensor has a sensing axis substantially perpendicular to an excitation axis for a first mode of oscillation of the sensor as a whole.

Thus, it is possible to prevent the first mode of oscillation of the sensor as a whole disturbing measurements performed along the sensing axis of the sensor.

Advantageously, the link elements are substantially perpendicular to the vibrating element and preferably, the sensor has two parallel pairs of link elements disposed facing each other on opposite sides of the portion of the support element to which they are connected.

It is thus possible to make a plane sensor having a sensing axis which is contained in the plane of the sensor and whose position is affected little or not at all by manufacturing variation. In addition, with such a sensor, it is easy to arrange the link elements so that they present smaller stiffness along the sensing axis than in other directions. Specifically, the link elements work in bending for accelerations applied along the sensing axis, whereas the vibrating elements work in traction and compression, thus enabling the sensor to operate well, particularly at high frequency. Such a sensor is particularly simple to assemble. In addition, such a structure makes it possible to have link elements which extend over the entire thickness of the plate, thereby making it easier to machine said elements. Furthermore, sensor manufacture is made easier by the fact that the link elements can be made independently of the vibrating elements, thus making it possible, optionally, to make the link elements at some other time, or to do so in a plurality of operations.

BRIEF DESCRIPTION OF THE DRAWING

Other characteristics and advantages of the invention appear on reading the following description of particular, non-limiting embodiments of the invention.

Reference is made to the accompanying drawing, in which:

FIG. 1 is a diagrammatic plan view of an acceleration sensor constituting a first embodiment of the invention;

FIG. 2 is a view analogous to FIG. 1 of an acceleration sensor constituting a variant of the first embodiment; and FIG. 3 is a view analogous to FIG. 1 of an acceleration sensor constituting a second embodiment.

MORE DETAILED DESCRIPTION

With reference to FIG. 1, the acceleration sensor constituting the first embodiment comprises a plate given overall reference 1 made of piezoelectric quartz crystal having defined therein in conventional manner a vibrating element 2 having an end 3 connected to a support element 4 designed to be fixed in a housing, and an opposite end 5 connected to a test mass 6.

The test mass 6 is hinged to the support element 4 via two pairs of link elements 7. In this case, the link elements 7 are formed by deformable tabs which are formed in the plate 1 and extend through the entire thickness of the plate 1. The link elements 7 are perpendicular to the vibrating elements 2 and the pairs of link elements 7 are disposed facing each other on either side of the support element 4. The link elements 7 are arranged to facilitate movement in translation of the test mass 6 relative to the support element in the plane of the plate 1. The sensing direction of the sensor is thus contained in said plane and is parallel to the vibrating element 2. The link elements 7 preferably present stiffness that is much smaller parallel to the sensing axis than along other directions so that accelerations along the sensing axis are fully transmitted to the vibrating element 2 while accelerations in other directions are not transmitted to the vibrating element 2, insofar as that is possible.

The test mass 6 has a cavity 8 in which the vibrating element 2, the link elements 7, and a portion 9 of the support element 4 are received, the portion 9 having the vibrating element 2 and the link elements 7 attached thereto. This arrangement makes it possible to have a structure that is compact.

The portion 9 of the support element 4 is rectangular in shape and the cavity 8 surrounds the portion 9 on three sides.

The sensor includes a circuit (not shown) for piezoelectrically exciting the vibrating element 2 and arranged in known manner firstly to set the vibrating element 2 into vibration at a determined frequency, and secondly to detect variations in the frequency of vibration of the vibrating element 2. The circuit extends over one of the faces of the plate 1 and includes connection terminals for connection to an electronics module (not shown) for controlling the sensor. The circuit may be made either by localized deposition of metal on the plate 1, or by covering the face of the plate 1 in a layer of metal and then attacking or etching it so as to form the circuit using conventional techniques.

The control module of the sensor is arranged firstly to operate the excitation circuit and secondly to process the information relating to the frequency of vibration of the vibrating element 2.

In the variant shown in FIG. 2, the support element 4 has a cavity 10 receiving the vibrating element 2 in such a manner that only the end 5 of the vibrating element 2 projects into the cavity 8 so as to be connected to the test mass 6. This arrangement serves to further reduce the size of the sensor.

The other characteristics of this variant are identical to those of the first embodiment.

With reference to FIG. 3, the acceleration sensor constituting the second embodiment comprises a plate given overall reference 11 made of piezoelectric quartz crystal and having defined therein a vibrating element 12 with one end connected to a support element given overall reference 13 and an opposite end connected to a test mass 14. The support element 13 has a yoke-forming portion 15 for fixing in a housing, a decoupling frame 16 having one side secured to the yoke-forming portion 15 and an opposite side connected to a solid portion 17. The test mass 14 is connected to the solid portion 17 by the vibrating element 12 and link elements 18 which are constituted by deformable tabs formed in the plate 11 and which extend perpendicularly to the vibrating element 12. The link elements 18 are arranged to facilitate movement in translation of the test mass 14 relative to the support element 13 in such a manner that the sensing direction of the sensor is contained in the plane of the plate 11.

The test mass 14 has a cavity 19 receiving the vibrating elements 12, the link elements 18, and the solid portion 17 to which the vibrating element 12 and the link elements 18 are attached.

The solid portion 17 has a cavity 20 receiving the vibrating element 12 in such a manner that only the end of the vibrating element 12 that is connected to the test mass 14 projects into the cavity 19.

As in the first embodiment, the sensor has a circuit (not shown) for piezoelectrically exciting the vibrating element 12, and a control module for the sensor arranged firstly to control the excitation circuit and secondly to process the information relating to the frequency of vibration of the vibrating element 12.

In all cases, the sensor is preferably arranged in conventional manner so that the sensor has a structural first mode of oscillation (relating to the entire plate 1 as compared with the mode of vibration of the vibrating element which relates substantially to the vibrating element only and which is used for measurement purposes) having an excitation frequency which is greater than the range of frequencies needed for measuring accelerations so that this interfering structural mode of oscillation does not disturb measurement. Commonly, the excitation frequency of the structural mode of oscillation is pushed beyond 3000 hertz (Hz). The first mode of oscillation preferably has a direction of excitation that is orthogonal to the sensing axis.

Naturally, the invention is not limited to the embodiment described and variant embodiments can be applied thereto without going beyond the ambit of the invention as defined by the claims.

In particular, the invention applies to any vibrating element sensor. Thus, although the sensor described is made using a quartz crystal plate and implements the piezoelectric effect, the sensor could be made using a silicon plate with a vibrating element that is excited in capacitive, magnetic, thermoelectric, or other manner. The method of manufacturing such a sensor is analogous to that described above.

Similarly, although the invention is described in embodiments having a single vibrating element only, the invention also applies to sensors having a plurality of vibrating elements, and in particular vibrating elements that are associated in the manner of a tuning fork.

Although the sensor in the embodiments described has two pairs of link elements arranged to encourage movement in translation of the test mass relative to the support element in the plane of the sensor, the sensor may have some other number of link elements, for example two link elements arranged to facilitate movement in translation or in pivoting of the test mass relative to the support element.

The support element and the test mass may also have shapes other than those shown.

What is claimed is:

1. An inertial sensor comprising at least one vibrating element having one end connected to a support element and an opposite end connected to a test mass which is hinged to the support element by at least two link elements and which includes a cavity in which the vibrating element and a portion of the support element adjacent to the vibrating element are received, wherein the link elements are housed in the cavity surrounding a portion of the support element to which the link elements are connected, there being two parallel pairs of link elements disposed facing each other on opposite sides of the portion of the support element to which they are connected.

2. A sensor according to claim 1, wherein the support element includes a cavity in which there extends a portion of the vibrating element.

3. A sensor according to claim 1, wherein the link elements and the vibrating element are arranged in such a manner that the sensor has a sensing axis substantially perpendicular to an excitation axis for a first mode of oscillation of the sensor as a whole.

4. A sensor according to claim 3, wherein the link elements are substantially perpendicular to the vibrating element.

5. A sensor according to claim 1, comprising a plate in which there are defined the vibrating element, the support element, the test mass, and the link elements.

6. A sensor according to claim 1, wherein the support element includes a yoke-forming portion connected by a decoupling frame to the portion of the support element to which the vibrating element is connected.

* * * * *